US006847455B1

(12) United States Patent
Schmitz et al.

(10) Patent No.: US 6,847,455 B1
(45) Date of Patent: Jan. 25, 2005

(54) HETERODYNE INTERFEROMETER WITH ANGSTROM-LEVEL PERIODIC NONLINEARITY

(75) Inventors: Tony L. Schmitz, Gainesville, FL (US); John F. Beckwith, Indialantic, FL (US)

(73) Assignee: The United States of America as represented by the Department of Energy, Washington, DC (US)

( * ) Notice: Subject to any disclaimer, the term of this patent is extended or adjusted under 35 U.S.C. 154(b) by 299 days.

(21) Appl. No.: 10/254,567

(22) Filed: Sep. 26, 2002

Related U.S. Application Data

(60) Provisional application No. 60/350,925, filed on Jan. 25, 2002.

(51) Int. Cl.[7] .................................................. G01B 9/02
(52) U.S. Cl. ....................................................... 356/486
(58) Field of Search ................................ 356/486, 484, 356/485, 487, 489, 490

(56) References Cited

U.S. PATENT DOCUMENTS

| | | | |
|---|---|---|---|
| 3,796,495 A | * | 3/1974 | Laub ........................... 356/489 |
| 5,082,368 A | | 1/1992 | Fuchs et al. |
| 5,116,126 A | * | 5/1992 | Wang et al. .................. 356/486 |
| 5,159,406 A | * | 10/1992 | Adler et al. .................. 356/486 |
| 5,220,403 A | * | 6/1993 | Batchelder et al. .......... 356/450 |
| 5,579,109 A | | 11/1996 | Suh et al. |
| 5,677,768 A | | 10/1997 | Bockman |
| 5,781,295 A | | 7/1998 | Fuchs et al. |
| 5,784,161 A | | 7/1998 | Bechstein et al. |
| 5,828,474 A | | 10/1998 | Prucnal et al. |
| 5,838,439 A | * | 11/1998 | Zang et al. ................... 356/484 |
| 5,900,966 A | | 5/1999 | Kim et al. |
| 6,157,660 A | | 12/2000 | Hill |

OTHER PUBLICATIONS

Badami, V.G. & Patterson, S.R., "A Frequency Domain Method for the Measurement of Nonlinearity in Heterodyne Interferometry," Precision Engineering, 24, pp. 41–49, 2000.

Wu, Chien–ming Lawall, J. & Deslattes, R.D., "A Heterodyne Interferometer with Sub–atomic Periodic Nonlinearity," Applied Optics, vol. 38, No. 19, pp. 4089–4094, Jul. 1999.

Stone, J. & Howard, L. P., "A Simple Technique for Observing Periodic Nonlinearities in Michelson Interferometers," Precision Engineering, 22, pp. 220–232, 1998.

(List continued on next page.)

*Primary Examiner*—Gregory J. Toatley, Jr.
*Assistant Examiner*—Patrick Connolly
(74) *Attorney, Agent, or Firm*—William C. Daubenspeck; Paul A. Gottlieb

(57) ABSTRACT

Displacement measuring interferometer systems and methods are disclosed. One or more acousto-optic modulators for receiving a laser light beam from a laser light source can be utilized to split the laser light beam into two or more laser light beams, while spatially separating frequencies thereof. One or more reflective mechanisms can be utilized to reflect one or more of the laser light beams back to the acousto-optic modulator. Interference of two or more of the laser light beams generally at the acousto-optic modulator can provide an interfered laser light beam thereof. A detector for receiving the interfered laser light beam can be utilized to provide interferometer measurement data.

20 Claims, 10 Drawing Sheets

OTHER PUBLICATIONS

Wu, Chien–Ming & Deslattes, R. D., "Analytical Modeling of the Periodic Nonlinearity in Heterodyne Interferometry," Applied Optics, vol. 37, No. 28, pp. 6696–6700, Oct. 1, 1998.

Badami, V.G. & Patterson, S.R., "Investigation of Nonlinearity in High Accuracy Heterodyne Laser Interferometry ," American Society for Precision Engineering, Prceedings; vol. 16, pp. 153–156, 1996.

Patterson, S. & Beckwith, J., "Reduction of Systematic Errors in Heterodyne Interferometric Displacement Measurement,".

Proceedings of the $8^{th}$ International Precision Engineering Seminar, Elsevier Science, Inc., pp. 101–104, 1995.

Bobroff, N., "Recent Advances in Displacement Measuring Interferometry," Meas. Sci. Technol. 4, pp. 907–926, 1993.

Resenbluth, A.E., & Bobroff, N., "Optical Sources of Nonlinearity in Heterodyne Interferometers," Precision Engineering, vol. 12, No. 1, pp. 7–11, Jan. 1990.

Steinmetz, C.R., "Sub–micron Position Measurement and Control on Precision Machine Tools with Laser Interferometry," Precision Engineering, vol. 12, pp. 12–24, 1990.

Tanaka, M., Yamagi, T. & Nakayama, K., "Linear Interpolation of Periodic Error in a Heterodyne Laser Interferometer at Subnanometer Levels," Precision Engineering, IEEE, 1989.

Bobroff, N., "Residual Errors in Laser Interferometry from Air Turbulence and Nonlinearity," Applied Optics, Vo. 26, No. 13, pp. 2676–2682, Jul. 1, 1987.

Sutton, C.M., "Rapid Communications: Non–linearity in Length Measurement Using Heterodyne Laser Michelson Interferometry," J. Phys. E: Sci. Instrum. 20, pp. 1290–1292, 1987.

Barash, V. Ya. & Fedotova, G.V., "Heterodyne Interferometer to Measure Vibration Parameters," Measurement Techniques, vol. 27, No. 1, pp. 50–51, June 1984.

Fedotova, G.V., "Analysis of the Measurement of the Parameters of Mechanical Virations," Measurement Techniques, vol. 23, No. 7, pp. 577–580, 1980.

Whitman, R.L. & Korpel, A., "Probing of Acoustic Surface Pertubations by Coherent Light," Applied Optics, vol. 8, No. 8, pp. 1567–1576, Aug. 1969.

* cited by examiner

600

HETERODYNE INTERFEROMETER WITH ANGSTROM-LEVEL PERIODIC NONLINEARITY

CROSS REFERENCE TO RELATED PROVISIONAL PATENT APPLICATION

This patent application is related to provisional application, "AOM Displacement-Measuring Interferometer: A New Heterodyne Interferometer With Angstrom-Level Periodic Error," Ser. No. 60/350,925, which was filed on Jan. 24, 2002. This patent application claims the Jan. 25, 2002 filing date of this provisional patent application.

STATEMENT OF GOVERNMENT INTEREST

The invention described herein may be manufactured and used by or for the United States Government for Governmental purposes without the payment of any royalties.

TECHNICAL FIELD

The present invention is related to interferometry methods and devices thereof. The present invention is also related to distance measuring interferometers. The present invention is also related to acousto-optic modulators, optical fibers, and reflective mechanisms, such as retroreflectors and mirrors.

BACKGROUND OF THE INVENTION

Periodic error in heterodyne displacement-measuring interferometry is well known in the art. Researchers have identified and modeled sources of non-linearity in traditional Michelson-type heterodyne interferometers. Additionally, experimental configurations are known which tend to minimize or eliminate the periodic error inherent in these systems. Although such techniques have been successfully implemented, they typically require complex mechanical and/or electrical manipulations and are generally absent from commercial applications.

A fundamental source of systematic error in Michelson-type heterodyne interferometers is undesired leakage of each of the two polarization-coded light frequencies into both measurement and reference paths. In a perfect system, a single wavelength would travel to a fixed reference target, while a second, single wavelength should travel to a moving target. Interference of the combined signals would yield a perfectly sinusoidal trace with a phase that varied relative to a reference phase signal, in response to the motion of the moving target. The inherent frequency leakage of the two signals in actual implementations, however, tends to produce interference, or beat, signals, which are not exactly sinusoidal (i.e. contains spurious spectral content) and can lead to a periodic, or non-cumulative, error in measured displacements.

Experimental and analytical analyses of measurement signal frequency content have identified both first and second-harmonic periodic errors, or errors of one and two cycles per wavelength of optical path change, respectively. Physically, these errors arise from frequency leakage in the laser light source (non-orthogonality between the two frequencies exiting the laser head and ellipticity of the ideally linear output polarizations), non-ideal optical components (imperfect extinction between the two polarizations in the polarizing beamsplitter and retroreflector polarization rotation), mechanical misalignment of the interferometer (e.g. roll of the laser coordinate system with respect to the interferometer), parasitic reflections, and two-tone intermodulation distortions in the amplifying electronics.

FIG. 1 depicts a schematic diagram of a prior art heterodyne interferometer system 100. The setup for a typical, commercially available single pass heterodyne interferometer is also depicted in FIG. 1. As indicated in FIG. 1, system 100 generally includes a polarizing beamsplitter 106 in association with a measurement retroreflector 108 and a reference retroreflector 102. A light beam 110 can be transmitted from a laser light source (not shown in FIG. 1). Light beam 110 then encounters polarizing beamsplitter 106, such that a split portion of the light from light beam 110 is forced at a 90-degree angle to the original light beam 110 toward reference retroreflector 102. The portion of light beam 110 directed toward reference retroreflector 102 is ideally composed of light of frequency $f_1$, but includes light of frequency 104 (i.e., $f_2$) due to frequency leakage from one or more sources. Another portion of light beam 110, composed ideally of light with frequency $f_2$, can continue in a straight path toward measurement retroreflector 108. A returning light beam 112 possesses a Doppler-shifted frequency of $f_2+(f_1)\pm\Delta f_d$ and also encounters polarizing beamsplitter 106 and passes on to a light detector (not shown in FIG. 1).

Because of the effect of leakage, each optical frequency may be present in both the reference and measurement paths of the interferometer. Detection of the interference signal during constant-velocity motion of the measurement retroreflector 108 exhibits multiple spectral peaks if this leakage exists. FIG. 2, for example, illustrates a graph 200 depicting a representation of the heterodyne interferometer frequency spectrum for low velocity target motion. The desired AC interference measurement signal 206 is seen at a frequency equal to the beat frequency (i.e. the difference between the two optical source frequencies, $f_b$) up or down-shifted, depending on target direction, by a scalar amount proportional to the velocity of the moving retroreflector (i.e. the Doppler shift, $_\Delta f_d$).

With a proper alignment of the measurement beam and axis motion, the measurement signal amplitude can effectively remain constant during motion of the moving retroreflector. Also present, however, is spectral content that essentially remains at the beat frequency, known as spatial first-harmonic or AC reference terms 208, and a peak up or down-shifted from the beat frequency by an amount equal to, but opposite the measurement signal frequency shift, referred to as the second-harmonic or leakage-induced AC interference term 210.

Optical power terms 202 may also be observed at zero frequency and DC interference terms 204 at $+_\Delta f_d$ in fully leaking configurations, when each source frequency exists in both the measurement and reference paths. For low target velocities and the typical phase locked loop (PLL) modulation bandwidths associated with phase measuring electronics in commercially available systems, however, it is the AC reference and leakage-induced AC interference terms that generally dominate the periodic error magnitude. The attenuation of these error signals with respect to the measurement signal determines the peak-to-peak value of the resulting periodic error. Reported values have ranged from approximately 0.4 nm to 12 nm.

Based on the foregoing, the present inventors have concluded that a need exists for an improved interferometer, which is not plagued by the problems associated with prior art interferometer systems. In particular, the present inventors believe that a need exists for an improved displacement measuring interferometer (DMI), which does not rely on polarization coding and polarization-dependent optics to separate and recombine the reference and measurement frequencies of the heterodyne system. Therefore, a new concept for a heterodyne interferometer that minimizes periodic error, while maintaining a simple architecture, is described and illustrated herein.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

It is therefore one aspect of the present invention to provide improved interferometry systems and methods.

It is another aspect of the present invention to provide an improved displacement measuring interferometer (DMI).

It is a further aspect of the present invention to provide an improved displacement measuring interferometer, which can be configured utilizing one or more acousto-optic modulators (AOM), optical fibers, and retroreflector devices.

It is a further aspect of the present invention to provide an improved displacement measuring interferometer, which does not rely on polarization coding and polarization-dependent optics to separate and recombine the reference and measurement frequencies of the heterodyne system.

The above and other aspects can be achieved as will now be summarized. In general, one or more acousto-optic modulators for receiving a laser light beam from a laser light source can be utilized to split the laser light beam into two or more laser light beams, each with a slightly different frequency, while spatially separating frequencies thereof. One or more retroreflectors can be utilized to reflect one or more of the laser light beams back to the acousto-optic modulator. Interference of two or more of the laser light beams at the acousto-optic modulator provides an interfered laser light beam thereof that carries the displacement information. A detector for receiving the interfered laser light beam can be utilized to provide interferometer displacement measurement data.

The present invention can include a laser light source for providing a first laser beam at an optical frequency $f_0$, and a mechanism for providing an acoustic signal having an acoustic frequency $f_{acoustic}$. A first acousto-optic modulator can be utilized to receive the first laser beam at a Bragg angle $\theta_B$, and also to receive the acoustic signal. The acousto-optic modulator can provide two laser beams, the first of the two laser beams being a portion of the first laser beam transmitted directly through the acousto-optic modulator at the optical frequency $f_0$, and the second of the two laser beams having an optical frequency of the first laser beam shifted by the acoustic frequency ($f_0+f_{acoustic}$ or $f_0-f_{acoustic}$), and exiting the acousto-optic modulator at twice the Bragg angle $\theta_B$ with respect to direction of the first of the two laser beams.

Additionally, a reference retroreflector can be utilized to reflect the first of the two laser beams back to the acousto-optic modulator. Likewise, a measurement retroreflector can be utilized to reflect the second of the two laser beams back to the acousto-optic modulator. The first and second of the two reflected laser beams can interfere with each other in the acousto-optic modulator to provide an interfered laser beam. A detector can receive and detect the interfered laser beam for interferometer displacement measurement thereof. A second acousto-optic modulator can also be disposed in the path of the first laser beam to frequency shift any back-reflected light to isolate the back-reflected light from the laser source. A non-polarizing beam splitter can additionally be located between the first and second acousto-optic modulators to direct the light to the optical receiver.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

The present invention provides an improved displacement measuring interferometer (DMI), which does not rely on polarization coding and polarization-dependent optics to separate and recombine the reference and measurement frequencies of the heterodyne system. Instead, frequencies originate from an acousto-optic modulator (AOM) and remain spatially separated in the interferometer. The original and frequency-shifted beams travel to reference and measurement retroreflectors, respectively, return parallel and collinear to the original path, then recombine in the AOM. No other optical components are required. Because the measurement and reference beams are separated and recombined in the AOM, it serves the function of the polarization beamsplitter in typical heterodyne interferometers without introducing the leakage-induced periodic errors described previously.

Figure 1:
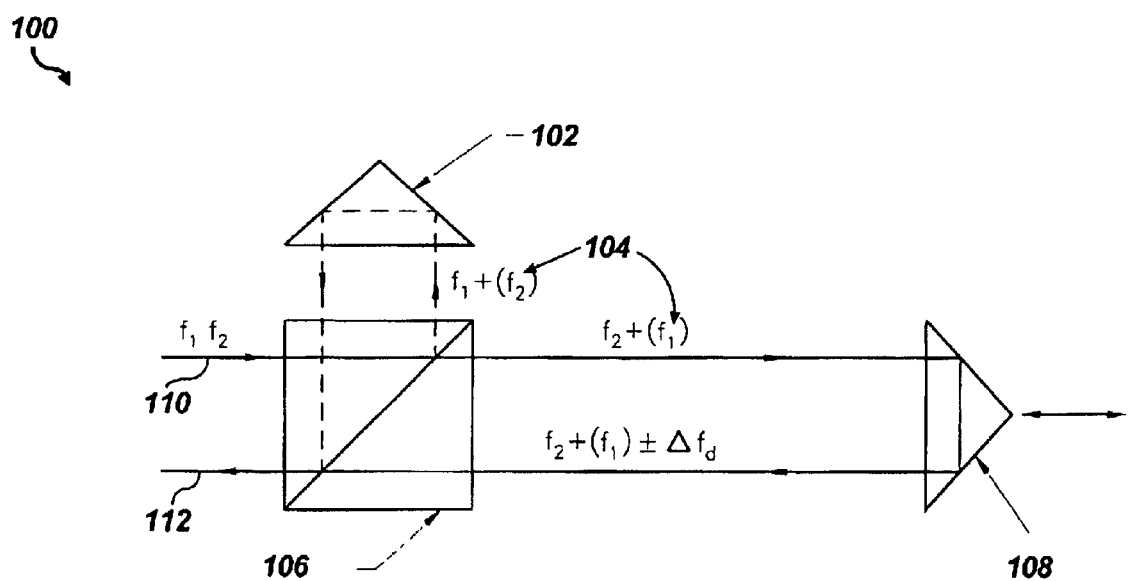
FIG. 1 depicts a schematic diagram of a prior art heterodyne interferometer system.
Figure 2:
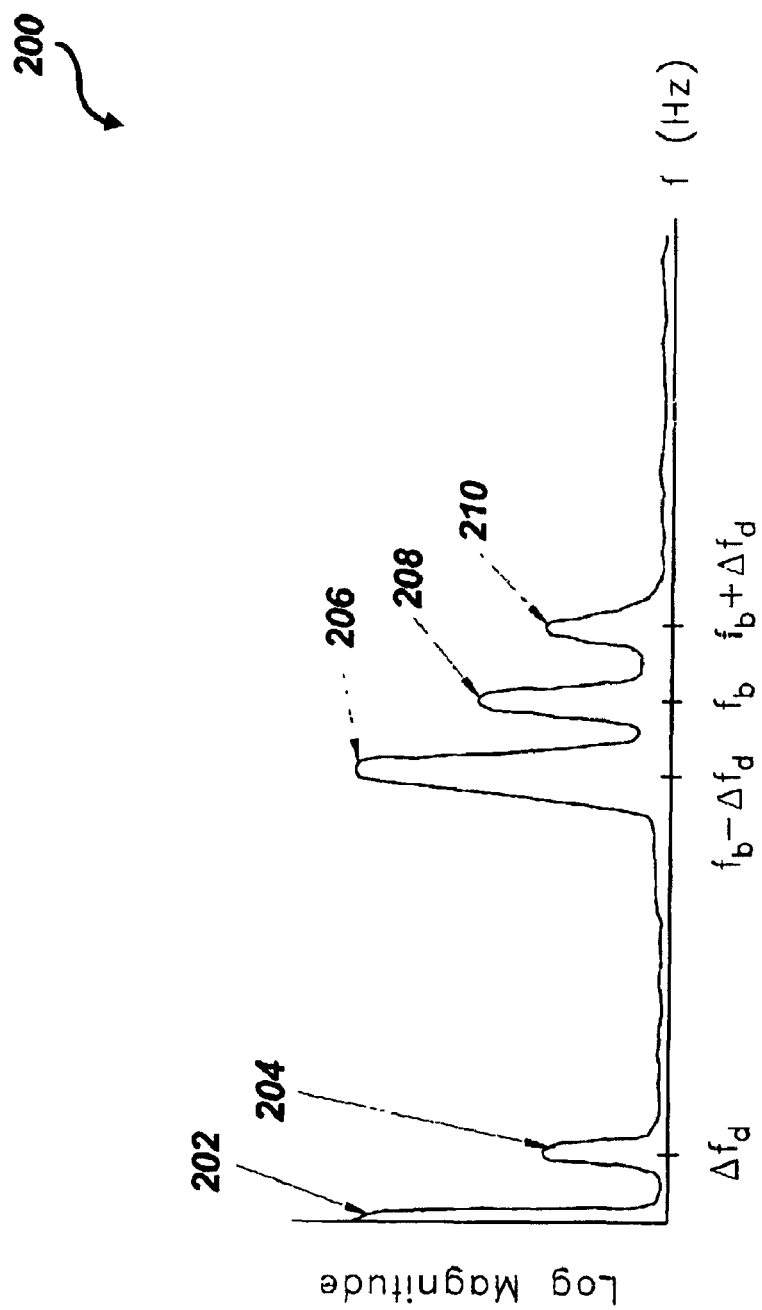
FIG. 2 illustrates a graph depicting the frequency spectrum for a typical heterodyne interferometer with low velocity target motion.
Figure 3:
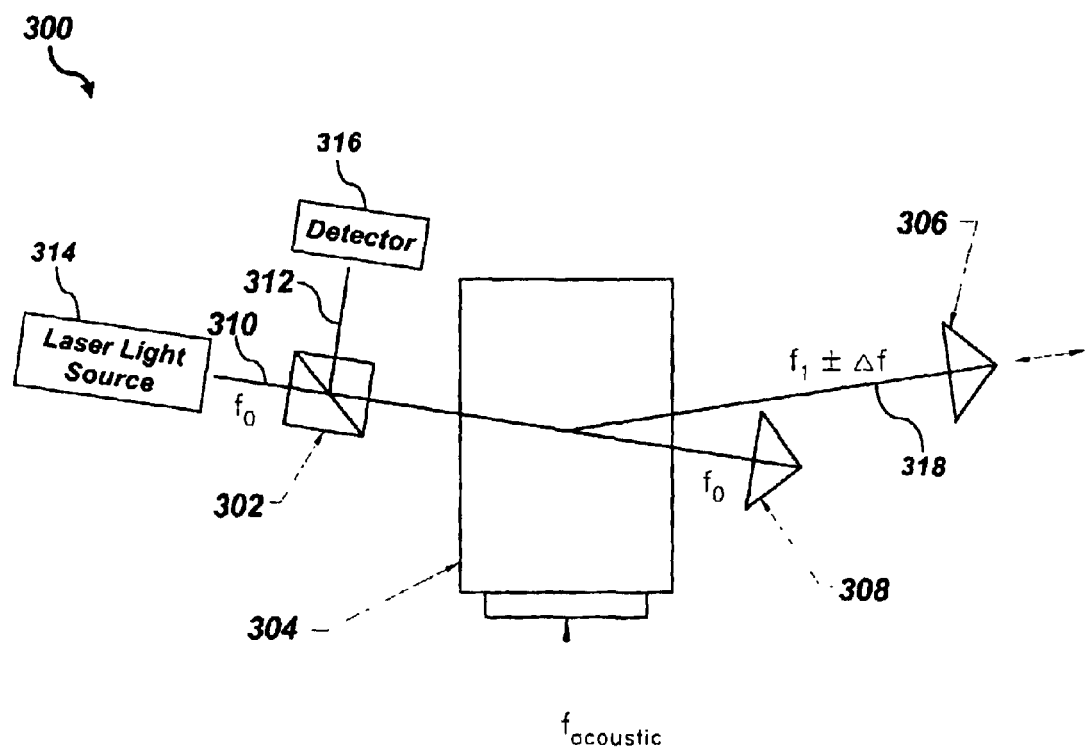
FIG. 3 depicts a block diagram illustrating an acousto-optic modulator (AOM) displacement measuring interferometer (DMI) system, which can be implemented in accordance with a preferred embodiment of the present invention.

FIG. 3 depicts a block diagram illustrating an AOM DMI system 300, which can be implemented in accordance with a preferred embodiment of the present invention. As indicated in FIG. 3, system 300 generally includes an AOM 304 in association with a reference retroreflector 308, a measurement retroreflector 306, and a beamsplitter 302. A light beam 310 is generally transmitted from a laser light source 314, which can be implemented as, for example, a single frequency, stabilized laser light source. Light (i.e., light beam 310) from such a single frequency, stabilized laser light source at an optical frequency $f_0$, is thus incident on AOM 304 to produce two beams: the original beam (i.e., light beam 310), as well as a diffracted light beam 318 having a frequency equal to the sum of the optical and acoustic frequencies, $f_1=f_0+f_{acoustic}$. The $f_0$ beam (i.e., light beam 310) then travels to a fixed reference retroreflector 308, while the $f_1$ beam (i.e., light beam 318) is travels to a measurement retroreflector 306. These beams return along parallel paths, respectively, and interfere within AOM 304.

The phase information regarding measurement retroreflector displacement (i.e., in the measurement beam direction) is now carried on the interfered signal and travels to a suitable detector, such as, for example, detector 316. Beamsplitter 302 is generally configured as a non-polarizing beamsplitter, which directs the measurement signal (i.e., light beam 312) to detector 316. It can be appreciated by those skilled in the art, however, that the use of such a beamsplitter is not a critical component to the operation of the device disclosed herein. Note that although retroreflectors, such as retroreflectors 306 and 308, are discussed herein with respect to preferred and/or alternative embodiments of the present invention, those skilled in the art can appreciate that other types of reflective mechanisms, such as mirrors, can be utilized to in association with the present invention. For example, any reflective surface, such as a mirror, can be utilized to direct a light beam back to AOM 304.

Figure 4:
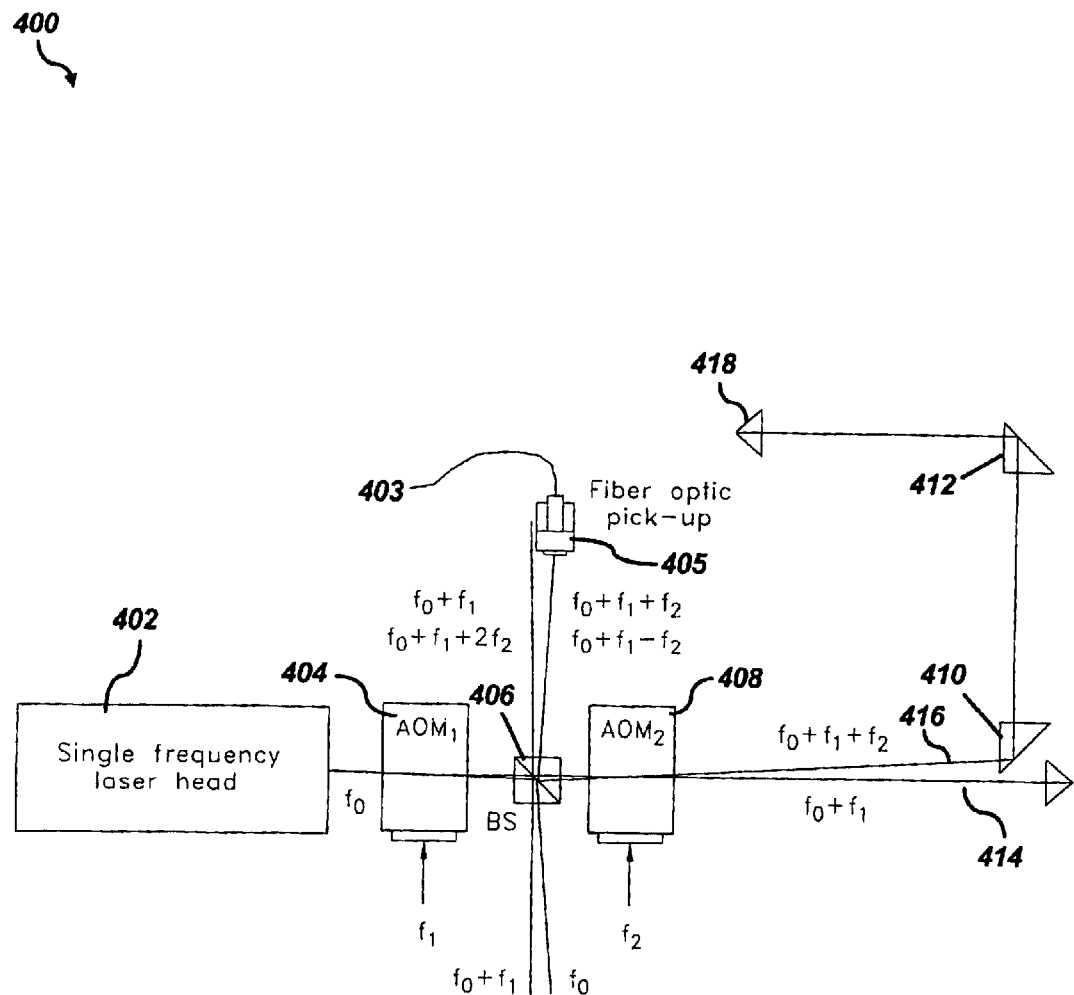
FIG. 4 illustrates a block diagram of an AOM DMI system, which can be implemented in accordance with a preferred embodiment of the present invention.

FIG. 4 illustrates a block diagram of an AOM DMI system 400, which can be implemented in accordance with a preferred embodiment of the present invention. Light from a single frequency, stabilized laser light source 402 (e.g., $f_0=473.6122\times10^{12}$ Hz, $\lambda_0=632.9914$ nm) is initially incident on an isolating AOM 404 with a driving frequency $f_1$ of approximately 65.5 MHz. The function of AOM 404 is generally to frequency shift any back-reflected light before it enters the source laser tube and causes destabilization. The up-shifted light from AOM 404 next passes through a non-polarizing beamsplitter (BS) 406. In system 400, beamsplitter 406 can be utilized to direct an interference signal to an associated optical detector (i.e., not shown in FIG. 4). The light is then incident on the AOM interferometer (i.e., AOM 408) operating at a driving frequency $f_2$ of approximately 45.5 MHz.

At AOM 408, the frequency-shifted beam from the isolating AOM 404 can be diffracted into two components, which are depicted in FIG. 4 as light beams 414 and 416. Light beam 414 generally comprises a $0^{th}$ order component, while light beam 416 generally comprises a $1^{st}$ order component. The $0^{th}$ order component (i.e., frequency $f_0+f_1$) travels to a reference retroreflector 414 and the $1^{st}$ order component (i.e., frequency $f_0+f_1+f_2$) travels to a moving retroreflector 410. Because the angle between the two beams exiting the AOM 408 is generally small (e.g., <2 mrad), it may be necessary to allow the light to travel approximately 1.5 m before adequate spatial resolution is available to pick off the measurement beam and direct it toward measurement retroreflectors 412 and 418, which can be mounted on an air bearing slide.

Once the two beams travel individually to the reference retroreflector 414 and the measurement retroreflectors 410, 412 and 418, they interfere during a return path through AOM 408. Because the beams are still oriented at a Bragg angle, they can each be frequency shifted. In system 400, the reference beam can be diffracted into two components: $0^{th}$ order unchanged and $1^{st}$ order down-shifted. Similarly, the measurement beam can be split into two components: $0^{th}$ order unchanged and $1^{st}$ order up-shifted. Therefore signals are generally available, each with a beat frequency of approximately two times the AOM interferometer driving frequency, or $2f_2=2.45.5=91$ MHz One of the two available 91 MHz interference signals can be launched into a fiber-optic pick-up 405 and carried to a DC-1 GHz wide bandwidth receiver by a multi-mode fiber 403. Note that the interference of the $f_0+f_1+f_2$ measurement and $f_0+f_1-f_2$ down shifted reference signals can be arbitrarily selected for proof of concept. The receiver signal can then be input to, for example, a Model 8566B Hewlett-Packard spectrum analyzer with a bandwidth range of 100 Hz–22 GHz. The local spectral response can then be recorded as indicated respectively with respect to FIGS. 5 and 6 herein, for two cases: 1) no motion of the measurement retroreflector, and 2) 0.128 ms$^{-1}$ measurement retroreflector velocity.

Figure 5:
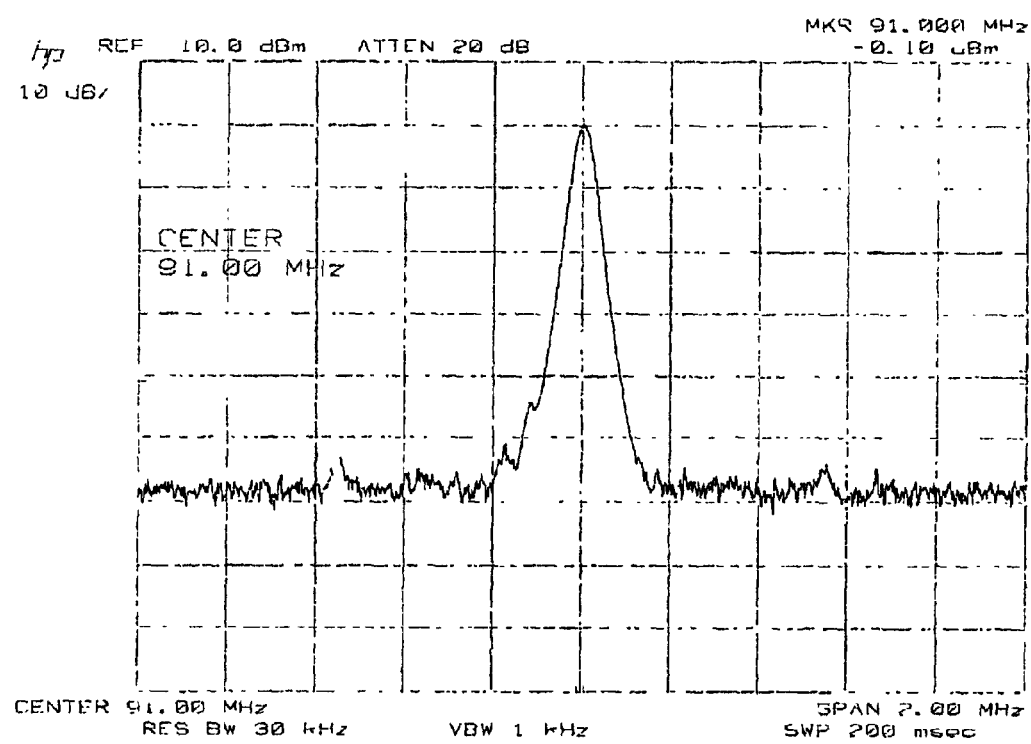
FIG. 5 depicts a graph illustrating a first case spectrum of interference signal, which can be implemented in accordance with a preferred embodiment of the present invention.
Figure 6:
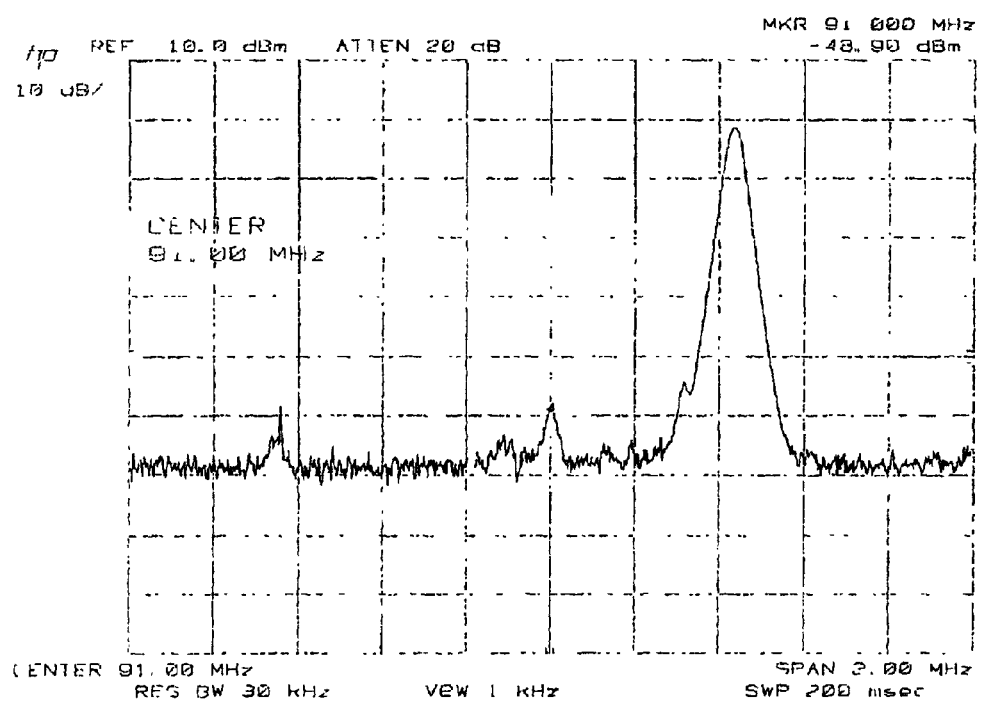
FIG. 6 illustrates a graph illustrating a second case spectrum of interference signal, which can be implemented in accordance with a preferred embodiment of the present invention.

FIG. 5 depicts a graph 500 illustrating a first case spectrum of interference signal, which can be implemented in accordance with a preferred embodiment of the present invention. FIG. 6 illustrates a graph 600 illustrating a second case spectrum of interference signal, which can be implemented in accordance with a preferred embodiment of the present invention. Graph 500 of FIG. 5 displays the spectrum for Case 1 with no measurement retroreflector motion (i.e., 10 dB/division vertical scale, 91 MHz center frequency, 2 MHz span horizontal scale). The static 91 MHz beat frequency is indicated in graph 500 with the noise floor attenuated by 55 dB. In graph 600 of FIG. 6, which is plotted with the same scale, the Case 2 result illustrates a 0.42 MHz shift of the measurement signal corresponding to the 0.128 ms$^{-1}$ slide motion for a single pass interferometer.

Content is also recognized at the original beat frequency suggesting a first-order periodic error. This signal, however, can be attenuated by 48.8 dB with respect to the original measurement signal and represents a non-cumulative error, $\delta x$, of only 0.18 nm (i.e., see equation (1) below, where FF is the interferometer fold factor). This error is attributed to multiple diffractions, or intermodulations due to reflected acoustic waves, within the AOM 408. Analyzing the spectrum of the beams exiting the AOM 408 can support this conclusion. Content shown in FIG. 5 was recorded at both 91 MHz and 131 MHz ($2f_1=2.65.5=131$ MHz), as well as multiples of these frequencies (i.e., $4f_1$, $4f_2$, etc). No appreciable second-order periodic error frequency content is seen.

$$\delta x = \frac{\lambda_0}{FF}\left(\frac{10^{\frac{-\Delta dB}{20}}}{2\pi}\right) = \frac{632.9914}{2}\left(\frac{10^{\frac{-48.8}{20}}}{2\pi}\right) = 0.18 \text{ nm} \quad (1)$$

The combined standard uncertainty, $u_c$, in this periodic error value may be determined according to the law of propagation of uncertainty, which is well known in the optical arts. As demonstrated in equation (2) below, the variance in a measured value, $u_c$, can be obtained by first calculating the partial derivatives of the functional relationship between the measured ($\delta x$) and input parameters ($\lambda_0$ and $_\Delta$dB) with respect to each input; then multiplying the partial derivatives by the standard uncertainty in the associated input (zero covariance between input quantities has been assumed); and, finally, summing the squares of each product. For standard uncertainties of $6\times10^{-6}$ nm in wavelength (0.01 ppm) and 0.5 dB in amplitude, the combined standard uncertainty in the periodic error measurement result is 0.01 nm (0.1 Å). It can be appreciated by those skilled in the art that this value can reflect the uncertainty in the periodic error computed from the spectrum analyzer signal alone. Further signal corruption, which can be imposed by the phase-measuring electronics, for example, is generally highly system dependent.

$$u_c^2(\delta x) = \left(\frac{\delta f}{\delta \lambda_0} u(\lambda_0)\right)^2 + \left(\frac{\delta f}{\delta \Delta dB} u(\Delta dB)\right)^2 = \left(\frac{10^{\frac{-\Delta db}{20}}}{2\pi} u(\lambda_0)\right)^2 + \left(\frac{-\lambda_0 \cdot \ln(10) \cdot 10^{\frac{-\Delta db}{20}}}{80\pi} u(\Delta dB)\right)^2 = 0.01^2 \text{ nm}^2 \quad (2)$$

A proof-of-concept carried out by the present inventors verified the possibility of using an AOM as a polarization-independent interferometer. An interference signal demonstrated 48.8 dB attenuation between the measurement signal and first-order periodic error on a bench-top setup with no external technique for reducing the system nonlinearity and a mechanical slide for motion generation (i.e., typical experimental setups use a vacuum cell, for example). The AOM DMI, however, did exhibit a first-order phase error, attributed to bi-directional acoustic interactions within the AOM, with a resulting periodic error of 0.18 nm (1.8 Å). Although this may not be a desired result, the AOM interferometer can present a 2 to 24 times decrease in the periodic error associated with commercial interferometers while maintaining a simple architecture.

There are several benefits associated with the application of the present invention, aside from the decreased periodic error. First, with respect to the required equipment, a single frequency laser light source is used rather than a more complex and expensive two-frequency laser head, fewer optical components are required, and only one photoreceiver per multiple axis system is necessary. The latter can be accomplished utilizing different AOM driving frequencies in each axis. Second, single mode fiber feed to each axis allows easy setup and alignment of a miniaturized package. Third, fiber launching of the light is generally simplified because polarization-maintaining fiber is not necessary for the polarization-independent interferometer. These benefits are depicted graphically in FIGS. 7 and 8.

Figure 7:
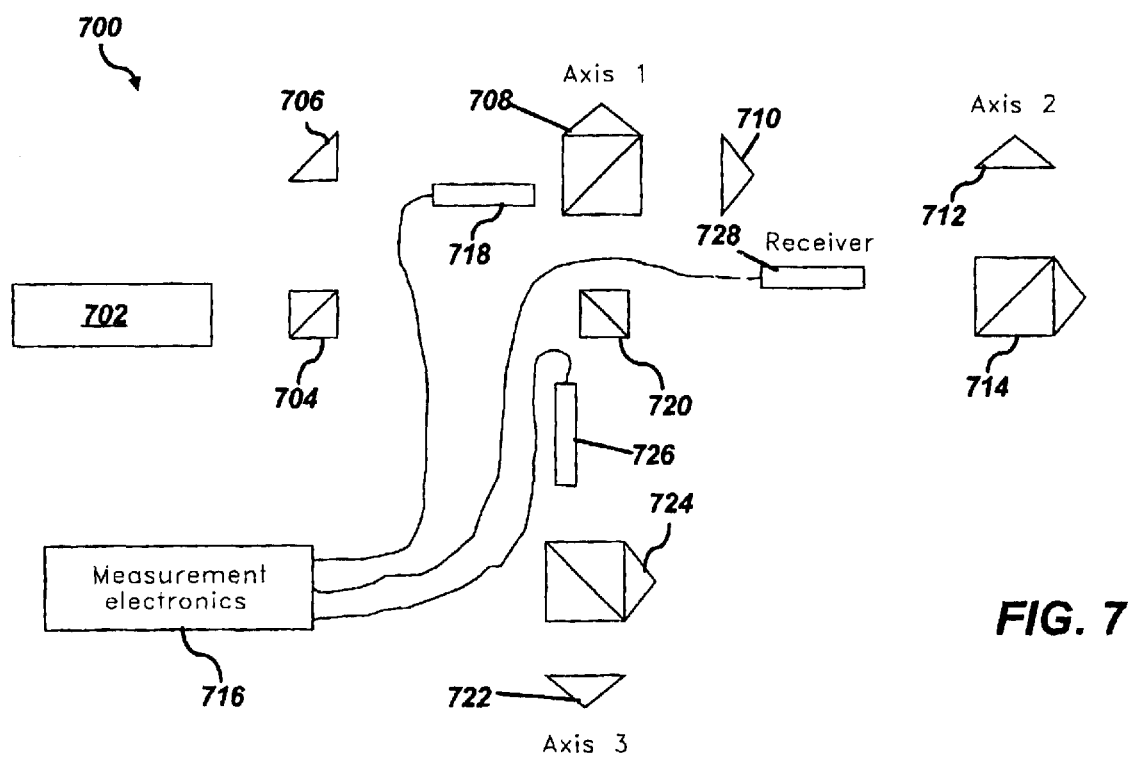
FIG. 7 depicts a block diagram illustrating minimum required hardware for a commercial three-axis system using polarization coded light and polarization maintaining optics.

FIG. 7 depicts a block diagram illustrating minimum required hardware for a commercial three-axis system 700 using traditional techniques of polarization coding, which could, for example, be utilized to monitor the axis motions on a precision cutting machine. In FIG. 7, system 700 generally includes a two frequency laser head 702 that provides light, which can be split by a 33% non-polarizing beamsplitter 704. Light split by beamsplitter 704 can be encountered by a 90-degree prism 706 and transferred to a polarizing beamsplitter/fixed retroreflector 708 and a moving retroreflector 710 along a first axis. A receiver 718 can be connected to measurements electronics 716. Light from laser head 702 can be further encountered by a 50% non-polarizing beamsplitter 720 and a polarizing beamsplitter/fixed retroreflector 714 in association with a moving retroreflector 712 along a second axis. A receiver 728 is also generally connected to measurement electronics 716. Additionally, third axis hardware can include a polarizing beamsplitter/fixed retroreflector 724 and a moving retroreflector 722 in association with a receiver 728, which can be coupled to measurement electronics 716.

Figure 8:
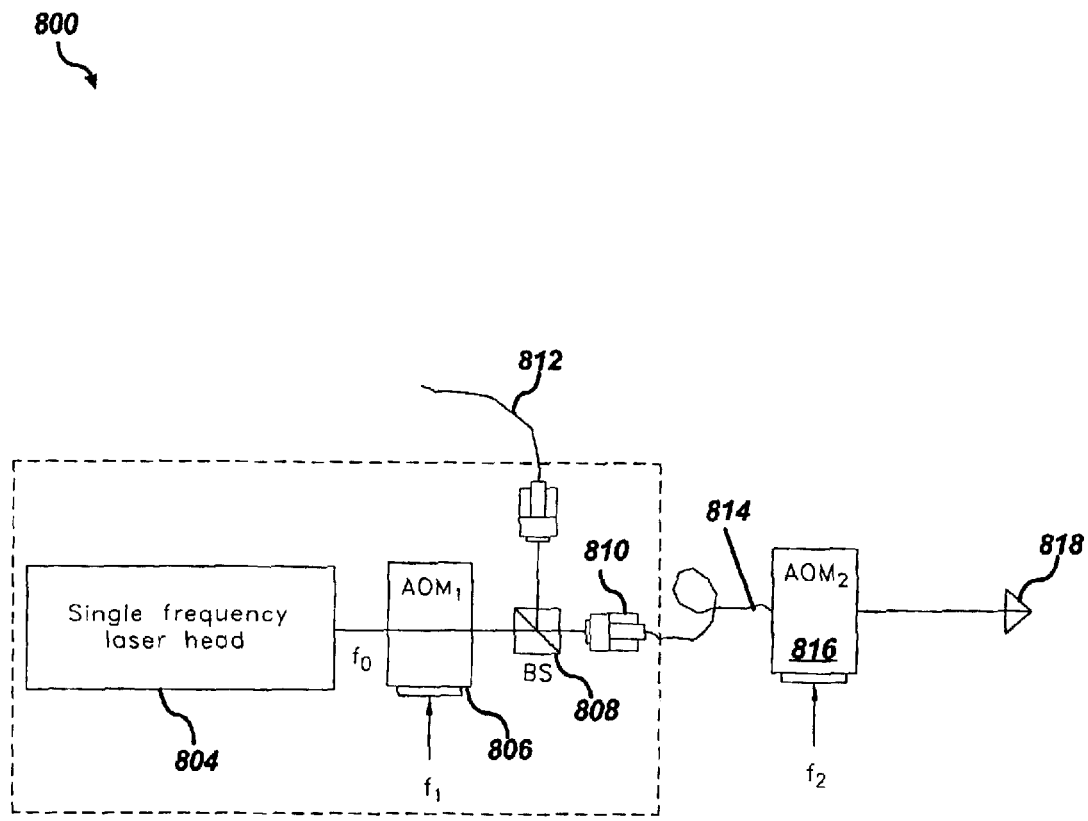
FIG. 8 illustrates a block diagram depicting hardware, which can be utilized for a single axis AOM DMI system, in accordance with an alternative embodiment of the present invention.

FIG. 8 illustrates a block diagram depicting hardware that can be utilized for a single axis AOM DMI system 800, in accordance with an alternative embodiment of the present invention. FIG. 8 shows a schematic of a single axis implementation of the AOM DMI. This configuration can be extended to multiple axes by launching the light from the source laser into a single mode fiber and using fiber splitters to separate the light into multiple channels, each of which could travel to a separate AOM operating at a unique driving frequency. As indicated in FIG. 8, system 800 can include a single frequency laser head 804, which provides a laser light beam that passes through a first AOM 806 and a non-polarizing beamsplitter (BS) 808. First and second fiber optic pick-ups 810 and 812 are shown located proximate to beamsplitter 808. A multi-mode fiber 812, which is connected to fiber optic pick up 812 can be further coupled to a detector (not shown), while a single mode fiber 814 can be connected to fiber optic pick-up 810 and a second AOM 816. A reference retroreflector can be integrated into the AOM 816 package in this figure. A measurement retroreflector 818 is located proximate to second AOM 816 to record the motion along the measurement axis.

Figure 9:
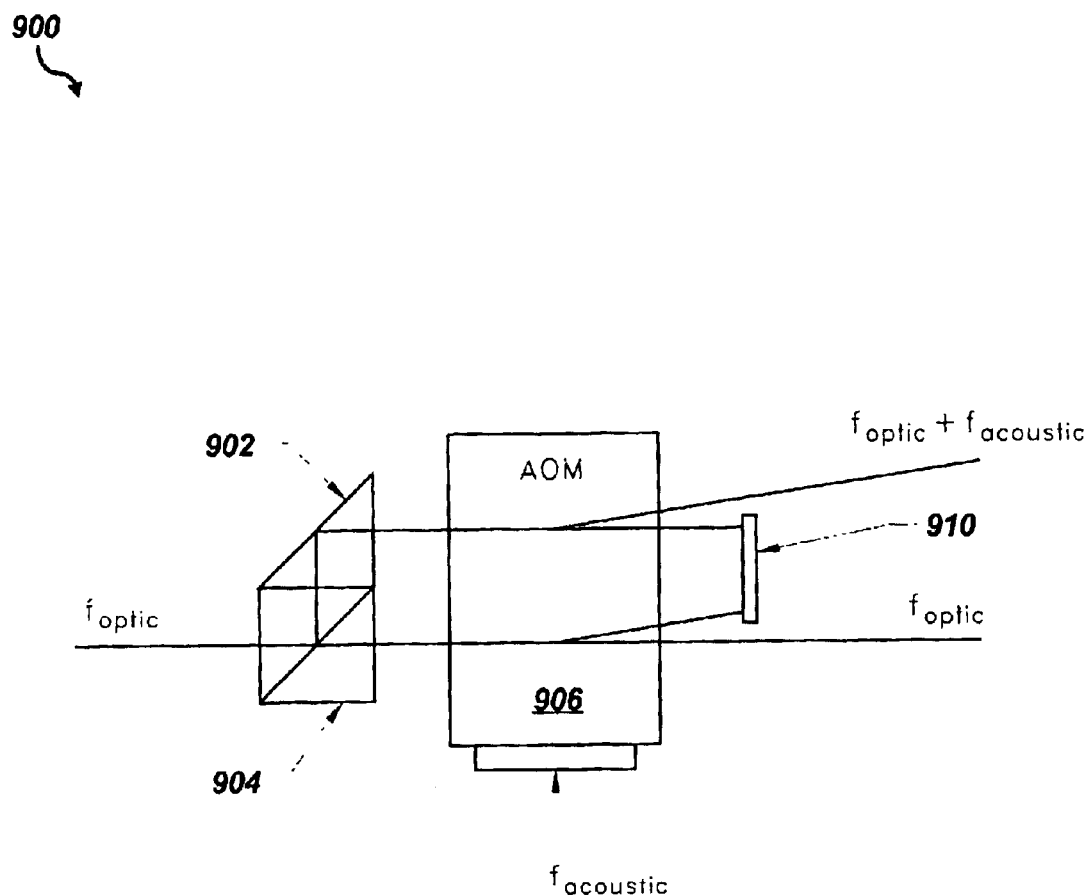
FIG. 9 depicts a block diagram illustrating an AOM DMI system, which can be implemented in accordance with an alternative embodiment of the present invention.
Figure 10:
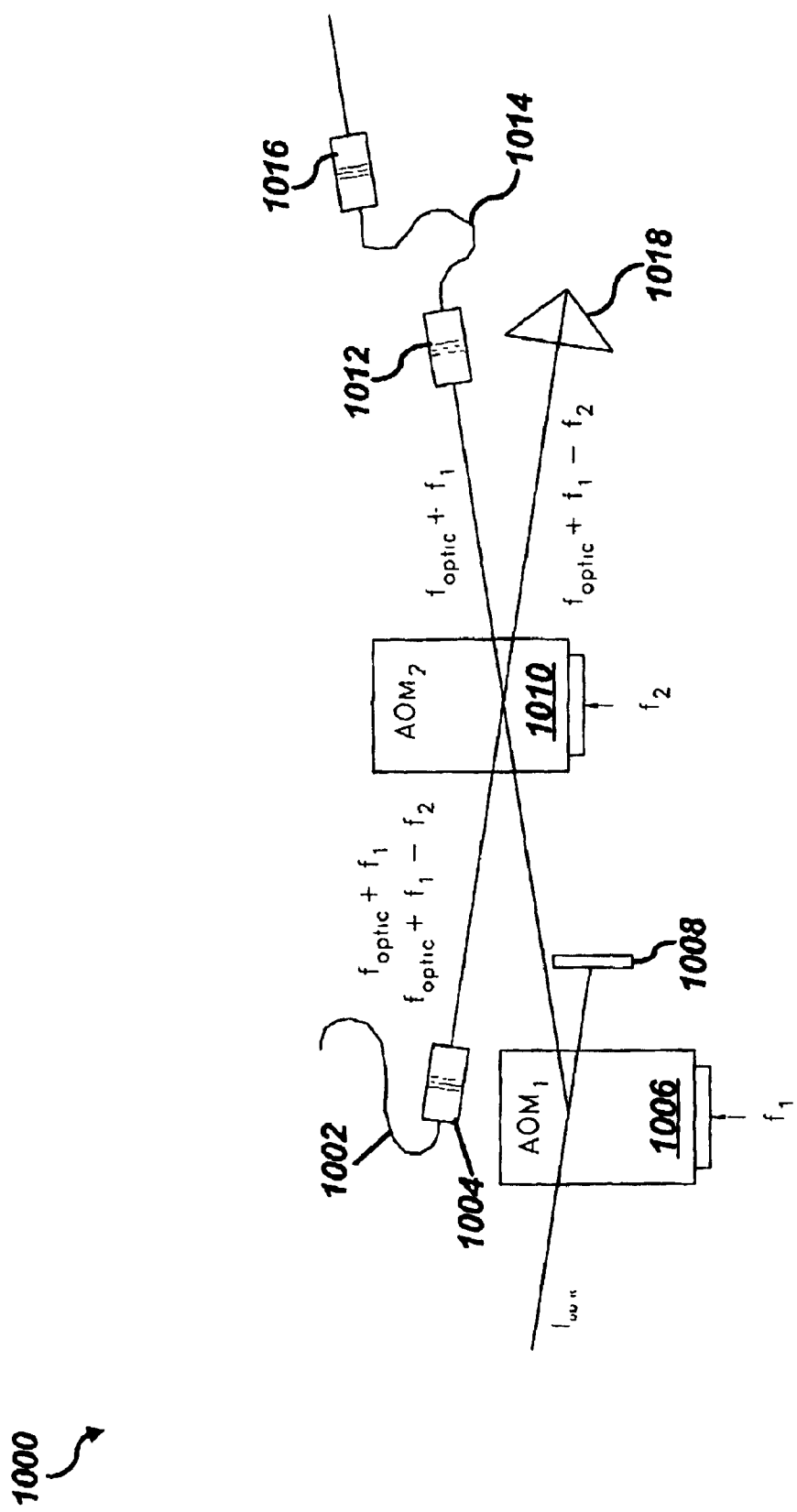
FIG. 10 illustrates a block diagram depicting an alternative AOM DMI system, which can be implemented in accordance with an alternative embodiment of the present invention.

The primary difficulty in implementing the AOM interferometer is adequate spatial separation of the measurement and reference beams given the small diffraction angle encountered in typical commercially available AOMs. Two techniques, which seek to overcome this difficulty, are depicted in FIGS. 9 and 10. FIG. 9 depicts a block diagram illustrating an AOM DMI system 900, which can be implemented in accordance with an alternative embodiment of the present invention. In FIG. 9, a simple optical configuration can be utilized to derive two beams, one offset from the other. System 900 includes an AOM 906 located generally to the right of a 90° prism 902 and a non-polarizing beamsplitter 904. A shutter 910 can be located to the right of AOM 906.

FIG. 10 illustrates a block diagram depicting an alternative AOM DMI system 1000, which can be implemented in accordance with an alternative embodiment of the present invention. FIG. 10 generally illustrates a two AOM configuration with a single mode fiber launch. Optical power may also be a consideration here. As indicated in FIG. 10, system 1000 generally includes a first AOM 1006 located to the left of a second AOM 1010. A shutter 1008 can be located to the right of first AOM 1006. A reference retroreflector 1018 can be located to the right of second AOM 1010. A fiber optic pick-up 1004 can be located to the left of second AOM 1010. An optical fiber 1002 is generally connected to fiber optic pick-up 1004 and can be further coupled to measurement electronics (not shown in FIG. 10). A fiber optic pick-up 1012 is generally located to the right of second AOM 1010 and can include a single mode fiber 1014, which is generally connected to a fiber optic pick-up 1016 that in turn can be coupled to a measurement retroreflector (not shown in FIG. 10).

Based on the foregoing, it can be appreciated that a new concept for a heterodyne Michelson-type interferometer that minimizes periodic error by eliminating frequency leakage is described herein. Such an improved interferometer can utilize an acousto-optic modulator as a beamsplitter/recombiner and is generally polarization independent. A proof-of-concept for the acousto-optic modulator based displacement measuring interferometer (AOM DMI) was developed and successful experimental results presented, as indicated herein. Such results included the demonstration of a 0.18 nm periodic error in a bench-top setup. Application considerations for the new device are also provided herein.

Based on the foregoing, it can be appreciated by those skilled in the art that one of the primary advantages of the present invention is the wide range of measuring capabilities that it offers. The present invention can be utilized for a wide variety of measuring applications, including, but not limiting to, for example, the ability to measure both large and small displacements. Other linear displacement transducers with this level of accuracy typically have demonstrated substantially smaller measurement ranges. In the measurement of surface acoustic perturbations, or very small displacements at the surface of solids, caused by, for example, bulk sound waves or electronic excitation of the base material, optical methods have been applied but total displacements of only fractions of an angstrom were recorded. The invention disclosed herein, however, can be utilized to very accurately measure very large displacements (e.g., tens of meters or more), although it can also be utilized to measure small displacements.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A displacement measuring interferometer system, said system comprising:
   at least one acousto-optic modulator for receiving a laser light beam from a laser light source, wherein said at least one acousto-optic modulator splits said laser light beam into at least two laser light beams and spatially separates frequencies thereof;
   at least one reflective mechanism for reflecting at least one of said at least two laser light beams back to said at least one acousto-optic modulator for interference of said at least two laser light beams by said at least one acousto-optic modulator to provide an interfered laser light beam thereof; and
   a detector for receiving said interfered laser light beam thereof.

2. The system of claim 1 wherein said at least one reflective mechanism further comprises:
   at least one reference reflector for reflecting a first of said at least two laser light beams back to said at least one acousto-optic modulator; and
   at least one measurement reflector for reflecting a second of said at least two laser light beams back to said acousto-optic modulator, wherein said first and second of said at least two laser light beams interfere with each other within said at least one acousto-optic modulator to provide said interfered laser light beam thereof.

3. The system of claim 1 wherein said at least one acousto-optic modulator comprises a beamsplitter for splitting said laser light beam provided by said laser light source.

4. The system of claim 1 further comprising a non-polarizing beamsplitter in association with said at least one acousto-optic modulator.

5. The system of claim 1 further comprising at least one fiber optic pick-up for receiving signals provided by said at least one reflective mechanism.

6. The system of claim 1 further comprising:
   a laser light source which provides said laser light beam at an optical frequency $f_0$; and
   acoustic mechanism for providing an acoustic signal having an acoustic frequency $f_{acoustic}$, wherein said at least one acousto-optic modulator receives said laser light beam provided by said laser light source at a Bragg angle $\theta_B$ and an acoustic signal.

7. The system of claim 6 wherein a first portion of said laser light beam is transmitted directly through said at least one acousto-optic modulator at said frequency $f_0$ and a second portion of said laser light beam possesses an optical frequency of said laser light beam shifted by an acoustic frequency, ($f_o + f_{acoustic}$ or $f_o - f_{acoustic}$) and exits said at least one acousto-optic modulator at twice said Bragg angle $\theta_B$ with respect to a direction of said first portion of said laser light beam.

8. A displacement measuring interferometer system, said system comprising:
   a laser light source for providing a first laser light beam at an optical frequency $f_0$;
   acoustic signaling mechanism for providing an acoustic signal having an acoustic frequency $f_{acoustic}$;
   a first acousto-optic modulator for receiving said first laser light beam at a Bragg angle $\theta_B$, and for receiving said acoustic signal, said acousto-optic modulator providing two laser light beams, wherein a first of said two laser light beams comprises a portion of said first laser light beam transmitted directly through said acousto-optic modulator at said optical frequency $f_0$, and a second of said two laser light beams comprises an optical frequency of said first laser light beam shifted by said acoustic frequency ($f_0 + f_{acoustic}$ or $f_0 - f_{acoustic}$), and wherein said second of said two laser light beams exits said acousto-optic modulator at twice said Bragg angle $\theta_B$ with respect to a direction of said first of said two laser light beams;
   a reference retroreflector for reflecting said first of said two laser light beams back to said acousto-optic modulator;
   a measurement retroreflector for reflecting said second of said two laser light beams back to said acousto-optic modulator, said first and second of said two reflected laser light beams interfering with each other in said acousto-optic modulator to provide an interfered laser light beam; and
   a detector for receiving said interfered laser light beam.

9. The system of claim 8 further comprising:
   a second acousto-optic modulator disposed in a path of said first laser light beam to frequency shift any back-reflected light to isolate back-reflected light from said laser light source.

10. The system of claim 1 further comprising:
    a non-polarizing beam splitter disposed between said first and second acousto-optic modulators.

11. A displacement measuring interferometer method, said method comprising the steps of:

receiving a laser light beam from a laser light source utilizing at least one acousto-optic modulator, wherein at least one acousto-optic modulator splits said laser light beam into at least two laser light beams and spatially separates frequencies thereof;

reflecting at least one of said at least two laser light beams back to said at least one acousto-optic modulator utilizing at least one reflective mechanism for interference of said at least two laser light beams by said at least one acousto-optic modulator to provide an interfered laser light beam thereof; and detecting said interfered laser light beam thereof utilizing a detector.

12. The method of claim 11 further comprising the step of configuring said at least one reflective mechanism to further comprise:

at least one reference reflector for reflecting a first of said at least two laser light beams back to said at least one acousto-optic modulator; and at least one measurement reflector for reflecting a second of said at least two laser light beams back to said acousto-optic modulator, wherein said first and second of said at least two laser light beams interfere with each other within said at least one acousto-optic modulator to provide said interfered laser light beam thereof.

13. The method of claim 11 further comprising the step of configuring said at least one acousto-optic modulator to comprise a beamsplitter for splitting said laser light beam provided by said laser light source.

14. The method of claim 11 further comprising the step of:

associating a non-polarizing beamsplitter with said at least one acousto-optic modulator.

15. The method of claim 11 further comprising the step of:

receiving signals provided by said at least one reflective mechanism utilizing at least one fiber optic pick-up.

16. The method of claim 11 further comprising the step of:

providing a laser light source which emits said laser light beam at an optical frequency $f_0$; and providing an acoustic signal having an acoustic frequency $f_{acoustic}$, wherein said at least one acousto-optic modulator receives said laser light beam provided by said laser light source at a Bragg angle $\theta_B$ and an acoustic signal.

17. The method of claim 16 further comprising the step of:

transmitting a first portion of said laser light beam directly through said at least one acousto-optic modulator at said frequency $f_0$, wherein a second portion of said laser light beam possesses an optical frequency of said laser light beam shifted by an acoustic frequency, ($f_o+f_{acoustic}$ or $f_o-f_{acoustic}$) and exits said at least one acousto-optic modulator at twice said Bragg angle $\theta_B$ with respect to a direction of said first portion of said laser light beam.

18. The method of claim 11 further (comprising the steps of:

configuring said at least one acousto-optic modulator to comprise a first acousto-optic modulator in association with a second acousto-optic modulator; and disposing a non-polarizing beamsplitter between said first acousto-optic modulator and said second acousto-optic modulator.

19. The method of claim 11 wherein said at least one acousto-optic modulator comprises a polarization-independent interferometer.

20. The method of claim 11 wherein said laser light source comprises a single frequency laser head.

* * * * *